(12) United States Patent
Gao

(10) Patent No.: US 12,236,037 B2
(45) Date of Patent: Feb. 25, 2025

(54) TOUCH CONTROL DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Lei Gao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 574 days.

(21) Appl. No.: 17/427,092

(22) PCT Filed: May 31, 2021

(86) PCT No.: PCT/CN2021/097312
§ 371 (c)(1),
(2) Date: Jul. 30, 2021

(87) PCT Pub. No.: WO2022/193442
PCT Pub. Date: Sep. 22, 2022

(65) Prior Publication Data
US 2023/0367413 A1    Nov. 16, 2023

(30) Foreign Application Priority Data
Mar. 17, 2021   (CN) .......................... 202110286187.6

(51) Int. Cl.
*G06F 3/041*    (2006.01)
*G06F 3/044*    (2006.01)
*G06F 3/046*    (2006.01)

(52) U.S. Cl.
CPC ............ *G06F 3/0416* (2013.01); *G06F 3/044* (2013.01); *G06F 3/046* (2013.01)

(58) Field of Classification Search
None
See application file for complete search history.

(56) References Cited

U.S. PATENT DOCUMENTS

2012/0154327 A1* 6/2012 Liu .......................... G06F 3/042
                                                                345/173
2012/0169400 A1* 7/2012 Liu ....................... G06F 3/0446
                                                                327/517
(Continued)

FOREIGN PATENT DOCUMENTS

CN       102609128 A    7/2012
CN       103577008 A    2/2014
(Continued)

OTHER PUBLICATIONS

International Search Report in International application No. PCT/CN2021/097312, mailed on Dec. 2, 2021.
(Continued)

*Primary Examiner* — Andre L Matthews
(74) *Attorney, Agent, or Firm* — PV IP PC; Wei Te Chung

(57) ABSTRACT

An embodiment of the present application discloses a touch control device, including a touch control substrate, wherein the touch control substrate includes a base and a touch control circuit arranged on the base, and the touch control device further includes a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch
(Continued)

control circuit also serves as sensing signal lines of the electromagnetic touch control circuit.

19 Claims, 5 Drawing Sheets

(56) References Cited

U.S. PATENT DOCUMENTS

| | | | | |
|---|---|---|---|---|
| 2013/0278548 | A1* | 10/2013 | Weng | G06F 3/0446 |
| | | | | 345/174 |
| 2014/0078104 | A1* | 3/2014 | Lee | G06F 3/0446 |
| | | | | 345/174 |
| 2014/0354560 | A1* | 12/2014 | Kim | G06F 3/046 |
| | | | | 345/173 |
| 2015/0070297 | A1* | 3/2015 | Mao | G06F 3/0446 |
| | | | | 345/174 |
| 2015/0145810 | A1 | 5/2015 | Shih | |
| 2015/0175810 | A1* | 6/2015 | Rieland | B44C 1/00 |
| | | | | 106/162.82 |
| 2016/0188090 | A1 | 6/2016 | Lu | |
| 2016/0259447 | A1* | 9/2016 | Lin | G06F 3/0446 |

FOREIGN PATENT DOCUMENTS

| | | |
|---|---|---|
| CN | 103677469 A | 3/2014 |
| CN | 104143763 A | 11/2014 |
| CN | 104216592 A | 12/2014 |
| CN | 104375732 A | 2/2015 |
| CN | 113050831 A | 6/2021 |

OTHER PUBLICATIONS

Written Opinion of the International Searching Authority in International application No. PCT/CN2021/097312, mailed on Dec. 2, 2021.

Chinese Office Action in corresponding Chinese Patent Application No. 202110286187.6 dated Jan. 14, 2022, pp. 1-11.

* cited by examiner

TOUCH CONTROL DEVICE

RELATED APPLICATIONS

This application is a Notional Phase of PCT Patent Application No. PCT/CN2021/097312 having international filing date of May 31, 2021, which claims the benefit of priority of Chinese Patent Application No. 202110286187.6 filed on Mar. 17, 2021. The contents of the above applications are all incorporated by reference as if fully set forth herein in their entirety.

BACKGROUND OF INVENTION

Field of Invention

The present application relates to the field of touch control, and in particular to a touch control device.

Description of Prior Art

At present, touch control devices on the market can be divided into capacitive touch control devices and electromagnetic touch control devices according to realization principle. The capacitive touch control devices can be directly operated with a stylus or a finger, and have a wide range of applications but limited touch control accuracy. The electromagnetic touch control devices require a matching stylus to achieve touch control operation, and have high touch control accuracy but limited convenience. At present, devices compatible with capacitive touch control and electromagnetic touch control need to add another layer of electromagnetic touch control structure on a basis of the existing capacitive touch control structure, which increases complexity and manufacturing difficulties of the touch control devices, and is not conducive to development trend of lightness and thinness.

SUMMARY OF INVENTION

An embodiment of the present application provides a touch control device, which solves a technical problem that a structure of the touch control device compatible with capacitive touch control and electromagnetic touch control in the prior art is too complicated.

An embodiment of the present application provides touch control device, including a touch control substrate, wherein the touch control substrate includes a base and a touch control circuit arranged on the base, and the touch control device further includes a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit.

Optionally, in some embodiments of the present application, the touch control device further includes a display panel, and all of the sensing signal lines of the capacitive touch control circuit located in a display area of the display panel also serve as the sensing signal lines of the electromagnetic touch control circuit.

Optionally, in some embodiments of the present application, the touch control circuit includes a plurality of first touch control lines and a plurality of second touch control lines, the first touch control lines intersect and are insulated from the second touch control lines;
  wherein the touch control mode switching circuit includes a first switch control circuit and a second switch control circuit, at least two of the first touch control lines are electrically connected to the first switch control circuit, and at least two of the second touch control lines are electrically connected to the second switch control circuit;
  wherein when each of the first switch control circuit and the second switch control circuit is in an off mode, the at least two of the first touch control lines are disconnected from each other, the at least two second touch control lines are disconnected from each other, and the touch control circuit is a mutual capacitive touch control circuit; and
  wherein when each of the first switch control circuit and the second switch control circuit is in an on mode, two of the first touch control lines are electrically connected to each other, and two of the second touch control lines are electrically connected to each other, and the touch control circuit is an electromagnetic touch control circuit.

Optionally, in some embodiments of the present application, the first switch control circuit includes a first switch, and opposite terminals of the first switch are electrically connected to adjacent ones of the first touch control lines, respectively; and the second switch control circuit includes a second switch, and opposite terminals of the second switch are electrically connected to adjacent ones of the second touch control lines, respectively;
  wherein when the touch control circuit is a mutual capacitive touch control circuit, the first switch and the second switch are both turned off, the adjacent ones of the first touch control lines are disconnected from each other, and the adjacent ones of the second touch control lines are disconnected from each other; and
  wherein when the touch control circuit is an electromagnetic touch control circuit, the first switch and the second switch are both turned on, the adjacent ones of the first touch control lines are electrically connected to each other, and the adjacent ones of the second touch control lines are electrically connected to each other.

Optionally, in some embodiments of the present application, when the touch control circuit is the mutual capacitive touch control circuit, the first touch control lines are transmission signal lines, and the second touch control lines are sensing signal lines; and
  wherein when the touch control circuit is the electromagnetic touch control circuit, the first touch control lines and the second touch control lines are both sensing signal lines.

Optionally, in some embodiments of the present application, the touch control mode switching circuit includes a touch control chip and a switch control circuit, and the first touch control lines and the second touch control lines are respectively electrically connected to the touch control chip;
  wherein when the touch control circuit is the mutual capacitive touch control circuit, the touch control chip outputs a touch control transmission signal to the first touch control lines, and the second touch control lines feed back touch control sensing signals to the touch control chip; and
  wherein when the touch control circuit is the electromagnetic touch control circuit, the touch control chip is built in with a first current measuring device and a second current measuring device; opposite terminals of the first current measuring device are respectively electrically connected to the first touch control lines in two rows that are electrically connected to each other, and opposite terminals of the second current measuring device are respectively electrically connected to the second touch control lines in two columns that are electrically connected to each other; and the first touch control lines and the second touch control lines are electrically connected to each other, and the first touch control lines and the second touch control lines feed back touch control sensing signals to the touch control chip.

Optionally, in some embodiments of the present application, the touch control device includes a display panel, wherein the first touch control lines and the second touch control lines are respectively disposed on opposite sides of a cover plate of the display panel.

Optionally, in some embodiments of the present application, the touch control device further includes a display panel, wherein the first touch control lines and the second touch control lines are insulated from each other and arranged on a same side of a cover plate of the display panel.

Optionally, in some embodiments of the present application, the touch control device further includes a display panel, wherein the first touch control lines and the second touch control lines are arranged in a same layer, and the first touch control lines are bridged at an intersection with the second touch control lines by a conductive structure located in another layer.

Optionally, in some embodiments of the present application, the touch control mode switching circuit includes a touch control chip and a switch control circuit, and the switch control circuit is built in the touch control chip.

Optionally, in some embodiments of the present application, the touch control circuit includes a plurality of sensing circuit units, each of the sensing circuit units includes one of third touch control lines, opposite terminals of the third touch control lines are electrically connected to the touch control mode switching circuit, respectively;
  wherein the touch control mode switching circuit includes a touch control chip and a selection switch control circuit; wherein when the selection switch control circuit selects a first channel, a first terminal of the third touch control lines is electrically connected to a second signal terminal of the touch control chip, a second terminal of the third touch control lines is electrically connected to a first signal terminal of the touch control chip, and the touch control circuit is the electromagnetic touch control circuit; and
  wherein when the selection switch control circuit selects a second channel, the first terminal of the third touch control lines is connected to the second terminal of the third touch control lines, and the second terminal of the third touch control lines is electrically connected to the first signal terminal of the touch control chip, and the touch control circuit is a self-capacitive touch control circuit.

Optionally, in some embodiments of the present application, each of the sensing circuit units includes the third touch control lines in a coil shape;
  wherein when the touch control circuit is the electromagnetic touch control circuit, the third touch control line forms a coil-shaped electromagnetic sensing circuit, and the third touch control lines are electromagnetic sensing signal lines; and
  wherein when the touch control circuit is the self-capacitive touch control circuit, the third touch control lines are capacitive sensing signal lines.

Optionally, in some embodiments of the present application, the selection switch control circuit includes a plurality of selection switches, and the first terminal of the third touch control lines is electrically connected to a selection terminal of the selection switches, the second terminal of the third touch control lines is electrically connected to the first signal terminal of the touch control chip, a first channel of the selection switches is electrically connected to the second signal terminal of the touch control chip, and a second channel of the selection switches is electrically connected to the first signal terminal of the touch control chip; and
  wherein the touch control mode switching circuit includes a third current measuring device electrically connected to the first terminal and the second terminal of the third touch control lines, respectively.

Optionally, in some embodiments of the present application, the third current measuring device is built in the touch control chip.

Optionally, in some embodiments of the present application, the touch control device further includes a display panel, wherein, in one scan period of the display panel, the touch control mode switching circuit controls the touch control circuit to switch between the capacitive touch control circuit and the electromagnetic touch control circuit at least once.

The present application also provides a touch control device, including a touch control substrate with a display area, wherein the touch control substrate includes a base and a touch control circuit arranged on the base, and the touch control device further includes a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit.

Optionally, in some embodiments of the present application, all of the sensing signal lines of the capacitive touch control circuit located in the display area also serve as the sensing signal lines of the electromagnetic touch control circuit.

Optionally, in some embodiments of the present application, the touch control circuit includes a plurality of first touch control lines and a plurality of second touch control lines, the first touch control lines intersect and are insulated from the second touch control lines;
  wherein the touch control mode switching circuit includes a first switch control circuit and a second switch control circuit, at least two of the first touch control lines are electrically connected to the first switch control circuit, and at least two of the second touch control lines are electrically connected to the second switch control circuit;
  wherein when each of the first switch control circuit and the second switch control circuit is in an off mode, the at least two of the first touch control lines are disconnected from each other, the at least two second touch control lines are disconnected from each other, and the touch control circuit is a mutual capacitive touch control circuit; and
  wherein when each of the first switch control circuit and the second switch control circuit is in an on mode, two of the first touch control lines are electrically connected to each other, and two of the second touch control lines are electrically connected to each other, and the touch control circuit is an electromagnetic touch control circuit.

Optionally, in some embodiments of the present application, the touch control circuit includes a plurality of sensing circuit units, each of the sensing circuit units includes one of third touch control lines, opposite terminals of the third touch control lines are electrically connected to the touch control mode switching circuit, respectively;

wherein the touch control mode switching circuit includes a touch control chip and a selection switch control circuit; wherein when the selection switch control circuit selects a first channel, a first terminal of the third touch control lines is electrically connected to a second signal terminal of the touch control chip, a second terminal of the third touch control lines is electrically connected to a first signal terminal of the touch control chip, and the touch control circuit is the electromagnetic touch control circuit; and wherein when the selection switch control circuit selects a second channel, the first terminal of the third touch control lines is connected to the second terminal of the third touch control lines, and the second terminal of the third touch control lines is electrically connected to the first signal terminal of the touch control chip, and the touch control circuit is a self-capacitive touch control circuit.

Optionally, in some embodiments of the present application, each of the sensing circuit units includes the third touch control lines in a coil shape;

wherein when the touch control circuit is the electromagnetic touch control circuit, the third touch control line forms a coil-shaped electromagnetic sensing circuit, and the third touch control lines are electromagnetic sensing signal lines; and wherein when the touch control circuit is the self-capacitive touch control circuit, the third touch control lines are capacitive sensing signal lines.

Beneficial effects of the present application: by adding a touch control mode switching circuit, the touch control circuit is controlled to switch between the capacitive touch control circuit and the electromagnetic touch control circuit, so that the touch control device can switch between the capacitive touch control mode and/or electromagnetic touch control mode, thereby expanding application scenarios of the touch control device. In addition, the sensing signal lines in the capacitive touch control mode also serve as the sensing signal lines in the electromagnetic touch control mode, which eliminates a need to increase a thickness of the existing touch control device, thus being conducive to a thin and light design of the touch control device.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

The present application provides a touch control device including a touch control substrate. The touch control substrate includes a base and a touch control circuit arranged on the base. The touch control device further includes a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit. In the present application, by having the sensing signal lines of the capacitive touch control circuit serve as the sensing signal lines of the electromagnetic touch control circuit, and adding a touch control mode switching circuit to control switching between the capacitive touch control circuit and the electromagnetic touch control circuit, the touch control device that can be compatible with more touch control modes is realized without an additional film structure.

Figure 1:
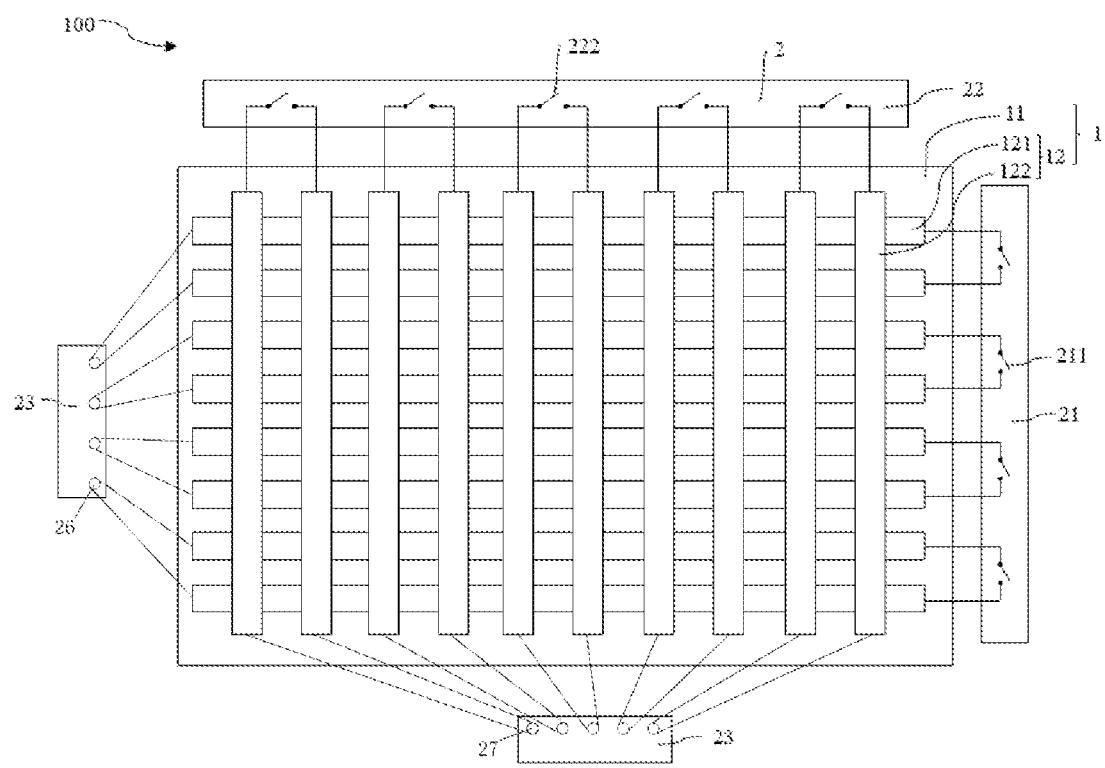
FIG. 1 is a schematic structural diagram of a touch control device provided by Embodiment 1 of the present application.
Figure 2:
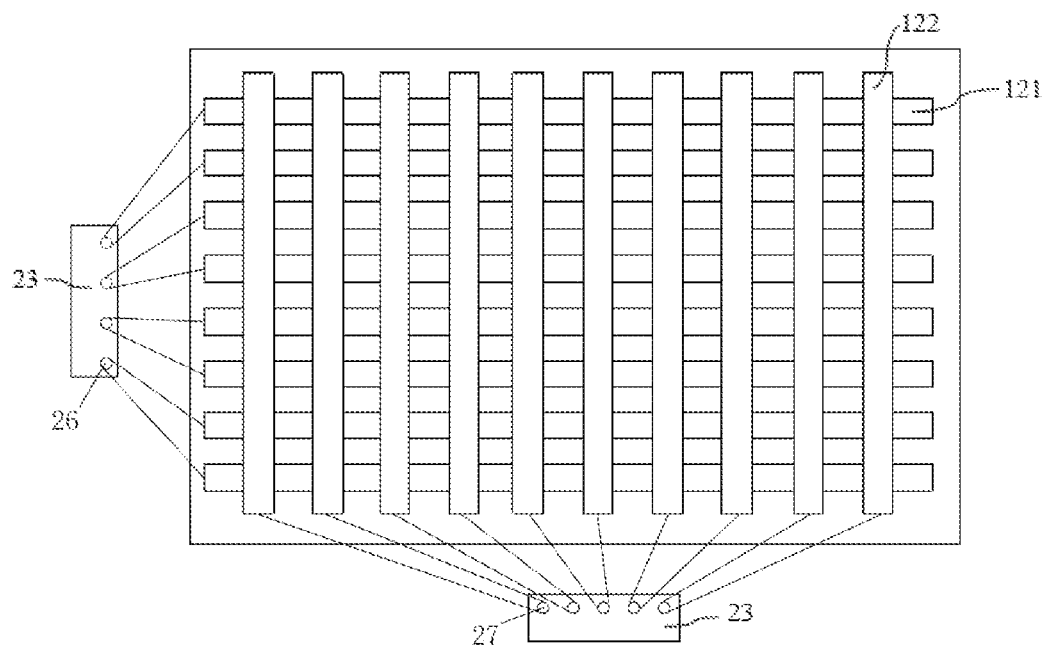
FIG. 2 is a schematic diagram showing a touch control circuit in the touch control device provided in FIG. 1 as a mutual capacitive touch control circuit.
Figure 3:
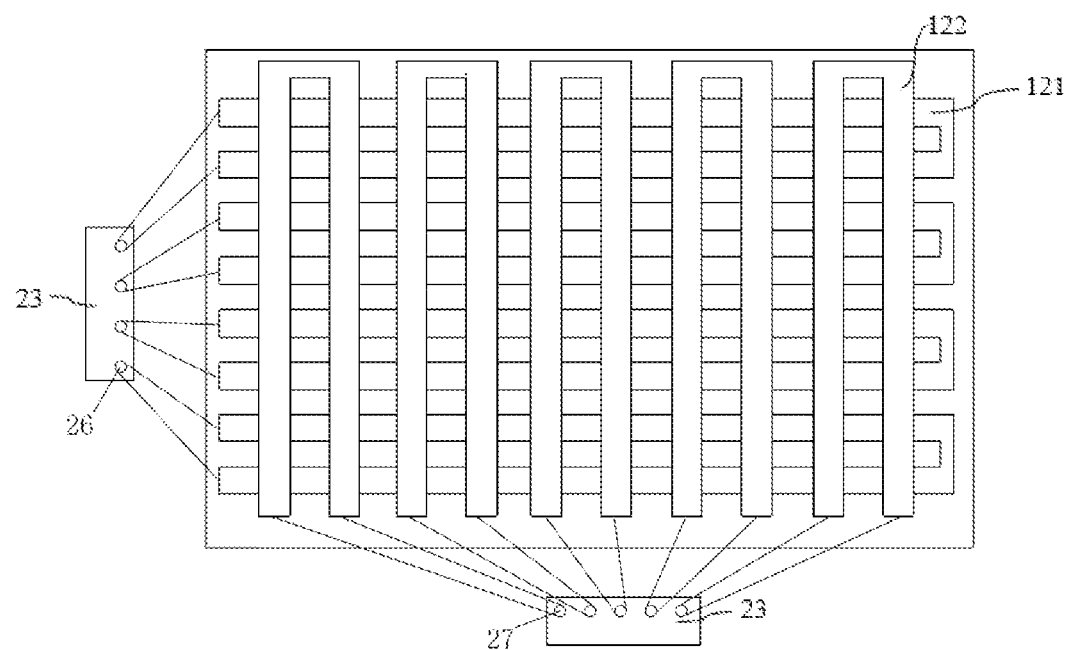
FIG. 3 is a schematic diagram showing the touch control circuit in the touch control device provided in FIG. 1 as an electromagnetic touch control circuit.

Embodiment 1 provided by the present application is shown in FIGS. 1 to 3. This embodiment provides a touch control device 100 including a touch control substrate 1 and a touch control mode switching circuit 2.

The touch control substrate 1 includes a base 11 and a touch control circuit 12 provided on the base 11. When the touch control device 1 is a touch control display device, the touch control substrate 1 may be a display panel provided with a display component, and the touch control circuit 12 is located in the display area of the display panel to realize the touch control display of the display panel. The touch control circuit 12 is electrically connected to the touch control mode switching circuit 2. The touch control mode switching circuit 2 controls the touch control circuit 12 to switch between the capacitive touch control circuit and the electromagnetic touch control circuit.

In this embodiment, the touch control circuit 12 includes multiple rows of first touch control lines 121 and multiple columns of second touch control lines 122. The first touch control lines 121 and the second touch control lines 122 are arranged alternately and insulated from each other. The touch control mode switching circuit 2 includes a first switch control circuit 21, a second switch control circuit 22, and a touch control chip 23. The first switch control circuit 21 is electrically connected to at least two rows of first touch control lines 121. The second switch control circuit 22 is electrically connected with at least two columns of second touch control lines 122. Specifically, the first switch control circuit 21 includes a plurality of first switches 211. Opposite terminals of each first switch 211 are respectively electrically connected to two adjacent rows of first touch control lines 121. The second switch control circuit 22 includes a plurality of second switches 222. Opposite terminals of each second switch 222 are electrically connected to two adjacent rows of second touch control lines 122 respectively.

When the first switch control circuit 21 and the second switch control circuit 22 are both in an off mode, the plurality of first switches 211 and the plurality of second switches 222 are all turned off, and the touch control circuit 12 is a mutual capacitive touch control circuit. As shown in conjunction with FIG. 2, the multiple rows of first touch control lines 121 are independent of each other, that is, the multiple rows of first touch control lines 121 are all disconnected. The multiple rows of second touch control lines 122 are independent of each other, that is, the multiple rows of second touch control lines 122 are all disconnected. In this embodiment, the first touch control lines 121 are transmission signal lines. The second touch control lines 122 are sensing signal lines. The touch control chip 23 outputs touch control emission signals to the first touch control lines 121. The second touch control lines 122 feed back touch control sensing signals to the touch control chip 23 to realize mutual capacitive touch control. It is appreciated that in other specific embodiments of the present application, the first touch control line 121 may also be used as a sensing signal line. The second touch control line 122 serves as a transmission signal line. The touch control chip 23 outputs a touch control transmission signal to the second touch control line 122. The first touch control line 121 feeds back touch control sensing signals to the touch control chip 23 to realize mutual capacitive touch control.

When the first switch control circuit 21 and the second switch control circuit 22 are both in an on mode, the plurality of first switches 211 and the plurality of second switches 222 are all turned on, and the touch control circuit 12 is an electromagnetic touch control circuit. As shown in FIG. 3, two adjacent rows of the first touch control lines 121 are electrically connected, and two adjacent columns of second touch control lines 122 are electrically connected. The first touch control lines 121 and the second touch control lines 122 are both sensing signal lines at this time. The touch control chip 23 is built with a first current measuring device 26 and a second current measuring device 27. Opposite terminals of the first current measuring device 26 are respectively electrically connected to two rows of first touch control lines 121 that are electrically connected to each other. The second current measuring device 27 is electrically connected to two rows of second touch control lines 122 that are electrically connected to each other, respectively. Both the first touch control line 121 and the second touch control line 122 feed back touch control sensing signals to the touch control chip 23 to achieve electromagnetic touch control.

In this embodiment, the second touch control line 122 is not only a sensing signal line of a mutual capacitive touch control circuit, but also a sensing signal line of an electromagnetic touch control circuit. That is, the sensing signal line of the capacitive touch control circuit also serves as the sensing signal line of the electromagnetic touch control circuit. Moreover, all the sensing signal lines of the capacitive touch control circuit are used as the sensing signal lines of the electromagnetic touch control circuit. When the touch control device 100 is a touch control display device, the portion of the second touch control lines 122 that is located in the display area of the display panel and serves as the sensing signal lines of the capacitive touch control circuit also serves as the sensing signal lines of the electromagnetic touch control circuit. In other words, the portion of the second touch control lines 122 located in the display area of the display panel will all be used as the sensing signal lines of the capacitive touch control circuit and the sensing signal lines of the electromagnetic touch control circuit.

It is appreciated that in other embodiments of the present application, in order to have other functions or effects such as repair and signal transmission, the capacitive sensing signal lines of the capacitive touch control circuit can be partially used as the electromagnetic sensing signal lines of the electromagnetic touch control circuit, which is not specifically limited herein.

In this embodiment, the first touch control lines 121 and the second touch control lines 122 are located on different layers that are insulated from each other. In the OLED display panel, the first touch control lines 121 and the second touch control lines 122 may be respectively arranged on opposite sides of the cover plate, or be insulated from each other and arranged on the same side of the cover plate. In a liquid-crystal display (LCD) display panel, the first touch control lines 121 and the second touch control lines 122 may be respectively arranged on opposite sides of the glass substrate, or insulated from each other on the same side of the glass substrate. It is appreciated that in other embodiments of the present application, the first touch control lines 121 and the second touch control lines 122 may be provided in the same layer. The first touch control lines 121 or the second touch control lines 122 are bridged by conductive structures located in other layers at the intersection of the two, which is not specifically limited herein.

It is appreciated that, in other embodiments of the present application, there is at least one first touch control line 121 or at least one second touch control line 122 that is not electrically connected to the switch control circuit, and is used for repair or for a single touch control mode, which is not specifically limited herein.

It is appreciated that, in other embodiments of the present application, opposite terminals of each first switch 211 are electrically connected to two non-adjacent rows of first touch control lines 121, or opposite terminals of each second switch 222 are respectively connected to two non-adjacent rows of second touch control lines 122. Redundant touch control lines are arranged between two rows or two columns of touch control lines electrically connected to the same switch, which is not specifically limited herein.

It is appreciated that the touch control mode switching circuit 2 can be provided on the touch control substrate 1 or can be provided on an external circuit board or flexible circuit board, which is not specifically limited herein. The external circuit board or flexible circuit board can be located on an opposite side to the driving chip of the display panel. Specifically, if the driving chip of the display panel is located on the left and lower sides of the display panel, the external circuit board or flexible circuit board provided with the touch control mode switching circuit 2 can be arranged on the right and upper sides of the display panel.

It is appreciated that the first switch control circuit 21 and/or the second switch control circuit 22 in the touch control mode switching circuit 2 can be built into the touch control chip 23, or can be provided on the touch control substrate 1, or can be provided on the external circuit board or flexible circuit board, which is not specifically limited herein.

Figure 4:
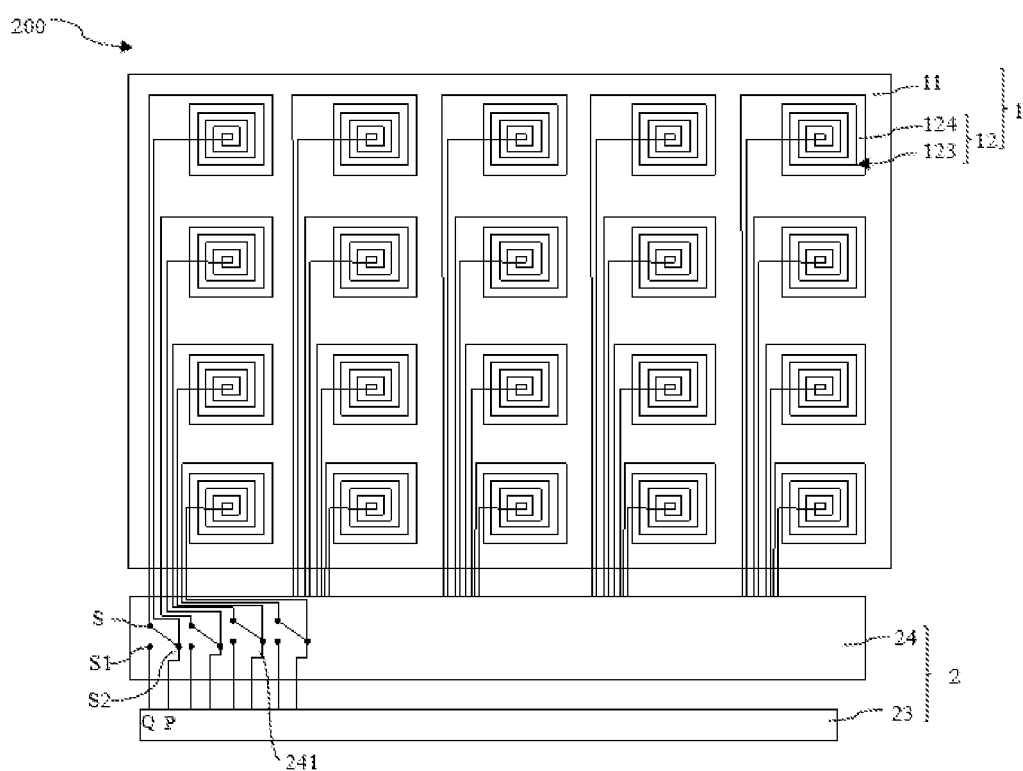
FIG. 4 is a schematic structural diagram of a touch control device provided by Embodiment 2 of the present application.
Figure 5:
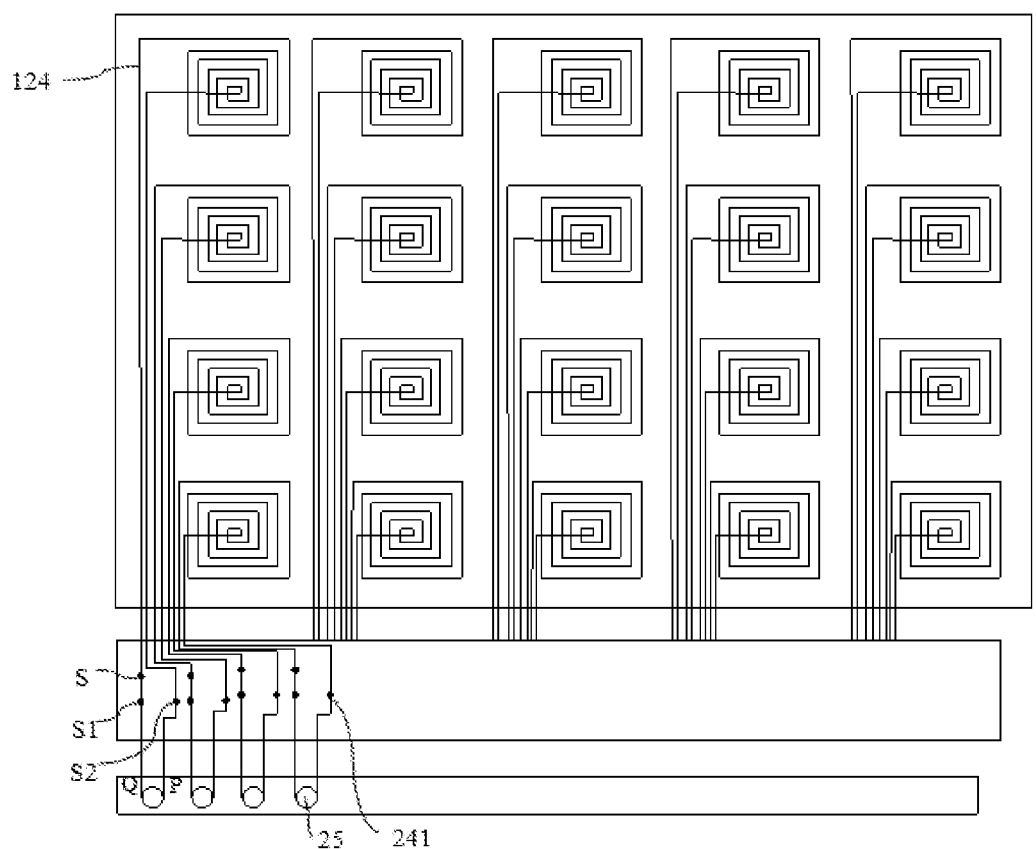
FIG. 5 is a schematic diagram showing the touch control circuit in the touch control device provided in FIG. 4 as the electromagnetic touch control circuit.

Embodiment 2 provided by the present application is shown in FIGS. 4 and 5. This embodiment provides a touch control device 200 including a touch control substrate 1 and a touch control mode switching circuit 2.

The touch control substrate 1 includes a base 11 and a touch control circuit 12 provided on the base 11. When the touch control device 1 is a touch control display device, the touch control substrate 1 may be a display panel provided with a display component, and the touch control circuit 12 is located in the display area of the display panel to realize the touch control display of the display panel. The touch control circuit 12 is electrically connected to the touch control mode switching circuit 2. The touch control mode switching circuit 2 controls the touch control circuit 12 to switch between the capacitive touch control circuit and the electromagnetic touch control circuit.

In this embodiment, the touch control circuit 12 includes a plurality of sensing circuit units 123. Each sensing circuit unit 123 includes a third touch control line 124 arranged in a coil shape. Opposite terminals of the third touch control line 124 are electrically connected to the touch control mode switching circuit 2 respectively.

The touch control mode switching circuit 2 includes a touch control chip 23 and a selection switch control circuit 24. The selection switch control circuit 24 includes a plurality of selection switches 241. A first terminal of each third touch control line 124 is electrically connected to a selection terminal S of a selection switch 241. A second terminal of each third touch control line 124 is electrically connected to the touch control chip 23. In the illustrated embodiment, the second terminal of a third touch control line 124 is electrically connected to a first signal terminal P of the touch control chip 23. A first channel S1 corresponding to the selection switch 241 is electrically connected to a second signal terminal Q of the touch control chip 23. A second channel S2 of the selection switch 241 is electrically connected to the first signal terminal P of the touch control chip 23.

When the selection switches 241 in the selection switch control circuit 24 all select the second channel S2, as shown in FIG. 4, the first terminal of the third touch control line 124 is electrically connected to the first signal terminal P of the touch control chip 23. That is, the first terminal of the third touch control line 124 and the second terminal of the third touch control line 124 are conducted and electrically connected to the first signal terminal P of the touch control chip 23. In this case, the touch control circuit 12 is a self-capacitive touch control circuit. The third touch control line 124 is a capacitive sensing signal line. The third touch control line 124 itself forms a closed loop through the selection switch 241. The third touch control line 124 feeds back the touch control sensing signal generated by the closed loop to the touch control chip 23 to realize self-capacitive touch control.

When the selection switches 241 in the selection switch control circuit 24 all select the first channel S1, as shown in FIG. 5, the first terminal of the third touch control line 124 is electrically connected to the second signal terminal Q of the touch control chip 23. The second terminal of the third touch control line 124 is electrically connected to the first signal terminal P of the touch control chip 23. The touch control circuit 12 is an electromagnetic touch control circuit. The third touch control line 124 is formed into a coil-shaped electromagnetic sensing circuit. The third touch control line 124 is an electromagnetic sensing signal line in this case. When the touch control circuit 12 is an electromagnetic touch control circuit, the touch control switching circuit 2 further includes a third current measuring device 25 electrically connected to the first terminal and the second terminal of the third touch control line 124, respectively. The third current measuring device 25 measures a sensing current fed back by the third touch control line 124 to the touch control chip 23 to realize electromagnetic touch control.

In this embodiment, the third touch control line 124 is both a capacitive sensing signal line of a self-capacitive touch control circuit and an electromagnetic sensing signal line of an electromagnetic touch control circuit. That is, the sensing signal line of the capacitive touch control circuit also serves as the sensing signal line of the electromagnetic touch control circuit. Moreover, all the sensing signal lines of the capacitive touch control circuit are used as the sensing signal lines of the electromagnetic touch control circuit. When the touch control device 200 is a touch control display device, the portion of the third touch control lines 124 that is located in the display area of the display panel and serves as the sensing signal lines of the capacitive touch control circuit also serves as the sensing signal lines of the electromagnetic touch control circuit. In other words, all of the portion of the third touch control lines 124 located in the display area of the display panel is used as the sensing signal lines of the capacitive touch control circuit and the sensing signal lines of the electromagnetic touch control circuit.

It is worth noting that FIGS. 4 and 5 only show the selection switch control circuit 24 corresponding to the portion of the third touch control lines 124, and the remaining portion of the third touch control lines 124 corresponding to the same circuit design as the selection switch control circuit 24 is not drawn repeatedly due to the limited space of the figure.

It is appreciated that in other embodiments of the present application, in order to have other functions or effects such as repair and signal transmission, the capacitive sensing signal lines of the capacitive touch control circuit can be partially used as the electromagnetic sensing signal lines of the electromagnetic touch control circuit, which is not specifically limited herein.

It is appreciated that in other embodiments of the present application, the third touch control line 124 may be located on the cover plate of the OLED display panel or on the glass substrate of the LCD display panel, which is not specifically limited herein.

It is appreciated that in other embodiments of the present application, there is at least one third touch control line 124 that is not electrically connected to the selection switch control circuit 24, and is used for repair or as a single touch control mode, which is not specifically limited herein.

It is appreciated that the touch control mode switching circuit 2 can be provided on the touch control substrate 1 or can be provided on an external circuit board or flexible circuit board, which is not specifically limited here. The external circuit board or flexible circuit board can be located on the opposite side to the driving chip of the display panel. Specifically, if the driving chip of the display panel is located on the left and lower sides of the display panel, the external circuit board or flexible circuit board provided with the touch control mode switching circuit 2 can be arranged on the right and upper sides of the display panel.

It is appreciated that the selection switch control circuit 24 in the touch control mode switching circuit 2 can be built into the touch control chip 23, can also be provided on the touch control substrate 1, or can be provided on the external circuit board or flexible circuit board, which is not specifically limited herein.

It is appreciated that the first current measuring device 26, the second current measuring device 27, and the third current measuring device 25 mentioned in the present application can be implemented by a structure built within the touch control chip 23, or they can be current measuring devices arranged outside the touch control chip 23, which is not specifically limited herein.

In a specific embodiment of the present application, when the touch control device is a touch control display device, in one scan period of the display panel, the touch control mode switching circuit controls the touch control circuit to switch between the capacitive touch control circuit and the electromagnetic touch control circuit at least once.

That is, in one scan period of the display panel, the touch control circuit 12 first detects whether there is a finger touch control through the capacitive touch control circuit, and then detects whether there is a stylus touch control through the electromagnetic touch control circuit, so that the touch control device can provide capacitive touch control mode and electromagnetic touch control mode at the same time, to enhance the recognition ability of the touch control device and expand application scenarios of touch control devices.

In the present application, by adding a touch control mode switching circuit, the touch control circuit is controlled to switch between the capacitive touch control circuit and the electromagnetic touch control circuit, so that the touch control device can switch between the capacitive touch control mode and/or electromagnetic touch control mode, thereby expanding application scenarios of the touch control device. In addition, the sensing signal lines in the capacitive touch control mode also serve as the sensing signal lines in the electromagnetic touch control mode, which eliminates a need to increase a thickness of the existing touch control device, thus being conducive to a thin and light design of the touch control device.

The touch control device provided in the embodiments of the present application have been described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A touch control device, comprising a touch control substrate, wherein the touch control substrate comprises a base and a touch control circuit arranged on the base, and the touch control device further comprises a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit;

wherein the touch control circuit comprises a plurality of first touch control lines and a plurality of second touch control lines, the first touch control lines intersect and are insulated from the second touch control lines;

wherein the touch control mode switching circuit comprises a first switch control circuit and a second switch control circuit, at least two of the first touch control lines are electrically connected to the first switch control circuit, and at least two of the second touch control lines are electrically connected to the second switch control circuit;

wherein when each of the first switch control circuit and the second switch control circuit is in an off mode, the at least two of the first touch control lines are disconnected from each other, the at least two second touch control lines are disconnected from each other, and the touch control circuit is a mutual capacitive touch control circuit; and wherein when each of the first switch control circuit and the second switch control circuit is in an on mode, two of the first touch control lines are electrically connected to each other, and two of the second touch control lines are electrically connected to each other, and the touch control circuit is the electromagnetic touch control circuit;

wherein the touch control device further comprises a display panel, and the first touch control lines and the second touch control lines are respectively disposed on opposite sides of a cover plate of the display panel.

2. The touch control device according to claim 1, wherein all of the sensing signal lines of the capacitive touch control circuit located in a display area of the display panel also serve as the sensing signal lines of the electromagnetic touch control circuit.

3. The touch control device according to claim 1, wherein the first switch control circuit comprises a first switch, and opposite terminals of the first switch are electrically connected to adjacent ones of the first touch control lines, respectively; and the second switch control circuit comprises a second switch, and opposite terminals of the second switch are electrically connected to adjacent ones of the second touch control lines, respectively;

wherein when the touch control circuit is the mutual capacitive touch control circuit, the first switch and the second switch are both turned off, the adjacent ones of the first touch control lines are disconnected from each other, and the adjacent ones of the second touch control lines are disconnected from each other; and wherein when the touch control circuit is the electromagnetic touch control circuit, the first switch and the second switch are both turned on, the adjacent ones of the first touch control lines are electrically connected to each other, and the adjacent ones of the second touch control lines are electrically connected to each other.

4. The touch control device according to claim 1, wherein when the touch control circuit is the mutual capacitive touch control circuit, the first touch control lines are transmission signal lines, and the second touch control lines are the sensing signal lines; and wherein when the touch control circuit is the electromagnetic touch control circuit, the first touch control lines and the second touch control lines are both the sensing signal lines.

5. The touch control device according to claim 1, wherein the touch control mode switching circuit comprises a touch control chip and a switch control circuit, and the first touch control lines and the second touch control lines are respectively electrically connected to the touch control chip;

wherein when the touch control circuit is the mutual capacitive touch control circuit, the touch control chip outputs a touch control transmission signal to the first touch control lines, and the second touch control lines feed back touch control sensing signals to the touch control chip; and wherein when the touch control circuit is the electromagnetic touch control circuit, the touch control chip is built in with a first current measuring device and a second current measuring device; both terminals of the first current measuring device are respectively electrically connected to the first touch control lines in two rows that are electrically connected to each other, and both terminals of the second current measuring device are respectively electrically connected to the second touch control lines in two columns that are electrically connected to each other; and the first touch control lines and the second touch control lines are electrically connected to each other, and the first touch control lines and the second touch control lines feed back the touch control sensing signals to the touch control chip.

6. The touch control device according to claim 1, wherein the touch control mode switching circuit comprises a touch control chip, and the first switch control circuit and the second switch control circuit are built in the touch control chip.

7. The touch control device according to claim 1, further comprising a display panel, wherein in one scan period of the display panel, the touch control mode switching circuit controls the touch control circuit to switch between the capacitive touch control circuit and the electromagnetic touch control circuit at least once.

8. A touch control device, comprising a touch control substrate with a display area, wherein the touch control substrate comprises a base and a touch control circuit arranged on the base, and the touch control device further comprises a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit;
  wherein the touch control circuit comprises a plurality of sensing circuit units, each of the sensing circuit units comprises one of first touch control lines, opposite terminals of the first touch control lines are electrically connected to the touch control mode switching circuit, respectively;
  wherein the touch control mode switching circuit comprises a touch control chip and a selection switch control circuit; wherein when the selection switch control circuit selects a first channel, a first terminal of the first touch control lines is electrically connected to a second signal terminal of the touch control chip, a second terminal of the first touch control lines is electrically connected to a first signal terminal of the touch control chip, and the touch control circuit is the electromagnetic touch control circuit; and
  wherein when the selection switch control circuit selects a second channel, the first terminal of the first touch control lines is connected to the second terminal of the first touch control lines, and the second terminal of the first touch control lines is electrically connected to the first signal terminal of the touch control chip, and the touch control circuit is a self-capacitive touch control circuit.

9. The touch control device according to claim 8, wherein all of the sensing signal lines of the capacitive touch control circuit located in the display area also serve as the sensing signal lines of the electromagnetic touch control circuit.

10. The touch control device according to claim 8, wherein the touch control circuit comprises a plurality of first touch control lines and a plurality of second touch control lines, the first touch control lines intersect and are insulated from the second touch control lines;
  wherein the touch control mode switching circuit comprises a first switch control circuit and a second switch control circuit, at least two of the first touch control lines are electrically connected to the first switch control circuit, and at least two of the second touch control lines are electrically connected to the second switch control circuit;
  wherein when each of the first switch control circuit and the second switch control circuit is in an off mode, the at least two of the first touch control lines are disconnected from each other, the at least two second touch control lines are disconnected from each other, and the touch control circuit is a mutual capacitive touch control circuit; and
  wherein when each of the first switch control circuit and the second switch control circuit is in an on mode, two of the first touch control lines are electrically connected to each other, and two of the second touch control lines are electrically connected to each other, and the touch control circuit is the electromagnetic touch control circuit.

11. The touch control device according to claim 8, wherein each of the sensing circuit units comprises the first touch control lines in a coil shape;
  wherein when the touch control circuit is the electromagnetic touch control circuit, the first touch control lines form a coil-shaped electromagnetic sensing circuit, and the first touch control lines are electromagnetic sensing signal lines; and
  wherein when the touch control circuit is the self-capacitive touch control circuit, the first touch control lines are capacitive sensing signal lines.

12. The touch control device according to claim 8, wherein the selection switch control circuit comprises a plurality of selection switches, and the first terminal of the first touch control lines is electrically connected to a selection terminal of the selection switches, the second terminal of the first touch control lines is electrically connected to the first signal terminal of the touch control chip, a first channel of the selection switches is electrically connected to the second signal terminal of the touch control chip, and a second channel of the selection switches is electrically connected to the first signal terminal of the touch control chip; and
  wherein the touch control mode switching circuit comprises a first current measuring device electrically connected to the first terminal and the second terminal of the first touch control lines, respectively.

13. The touch control device according to claim 12, wherein the first current measuring device is built in the touch control chip.

14. A touch control device, comprising a touch control substrate, wherein the touch control substrate comprises a base and a touch control circuit arranged on the base, and the touch control device further comprises a touch control mode switching circuit electrically connected to the touch control circuit, the touch control mode switching circuit controls the touch control circuit to switch between a capacitive touch control circuit and an electromagnetic touch control circuit, and at least part of sensing signal lines of the capacitive touch control circuit also serves as sensing signal lines of the electromagnetic touch control circuit;

wherein the touch control circuit comprises a plurality of first touch control lines and a plurality of second touch control lines, the first touch control lines intersect and are insulated from the second touch control lines;

wherein the touch control mode switching circuit comprises a first switch control circuit and a second switch control circuit, at least two of the first touch control lines are electrically connected to the first switch control circuit, and at least two of the second touch control lines are electrically connected to the second switch control circuit;

wherein when each of the first switch control circuit and the second switch control circuit is in an off mode, the at least two of the first touch control lines are disconnected from each other, the at least two second touch control lines are disconnected from each other, and the touch control circuit is a mutual capacitive touch control circuit; and wherein when each of the first switch control circuit and the second switch control circuit is in an on mode, two of the first touch control lines are electrically connected to each other, and two of the second touch control lines are electrically connected to each other, and the touch control circuit is the electromagnetic touch control circuit;

wherein the touch control device further comprises a display panel, and the first touch control lines and the second touch control lines are insulated from each other and arranged on a same side of a cover plate of the display panel;

wherein the touch control mode switching circuit comprises a touch control chip and a switch control circuit, and the first touch control lines and the second touch control lines are respectively electrically connected to the touch control chip;

wherein when the touch control circuit is the mutual capacitive touch control circuit, the touch control chip outputs a touch control transmission signal to the first touch control lines, and the second touch control lines feed back touch control sensing signals to the touch control chip; and wherein when the touch control circuit is the electromagnetic touch control circuit, the touch control chip is built in with a first current measuring device and a second current measuring device; both terminals of the first current measuring device are respectively electrically connected to the first touch control lines in two rows that are electrically connected to each other, and both terminals of the second current measuring device are respectively electrically connected to the second touch control lines in two columns that are electrically connected to each other; and the first touch control lines and the second touch control lines are electrically connected to each other, and the first touch control lines and the second touch control lines feed back the touch control sensing signals to the touch control chip.

15. The touch control device according to claim 14, wherein all of the sensing signal lines of the capacitive touch control circuit located in a display area of the display panel also serve as the sensing signal lines of the electromagnetic touch control circuit.

16. The touch control device according to claim 14, wherein the first switch control circuit comprises a first switch, and opposite terminals of the first switch are electrically connected to adjacent ones of the first touch control lines, respectively; and the second switch control circuit comprises a second switch, and opposite terminals of the second switch are electrically connected to adjacent ones of the second touch control lines, respectively;

wherein when the touch control circuit is the mutual capacitive touch control circuit, the first switch and the second switch are both turned off, the adjacent ones of the first touch control lines are disconnected from each other, and the adjacent ones of the second touch control lines are disconnected from each other; and wherein when the touch control circuit is the electromagnetic touch control circuit, the first switch and the second switch are both turned on, the adjacent ones of the first touch control lines are electrically connected to each other, and the adjacent ones of the second touch control lines are electrically connected to each other.

17. The touch control device according to claim 14, wherein when the touch control circuit is the mutual capacitive touch control circuit, the first touch control lines are transmission signal lines, and the second touch control lines are the sensing signal lines; and wherein when the touch control circuit is the electromagnetic touch control circuit, the first touch control lines and the second touch control lines are both the sensing signal lines.

18. The touch control device according to claim 14, wherein the first touch control lines and the second touch control lines are arranged in a same layer, and the first touch control lines are bridged at an intersection with the second touch control lines by a conductive structure located in another layer.

19. The touch control device according to claim 14, wherein the touch control mode switching circuit comprises a touch control chip, and the first switch control circuit and the second switch control circuit are built in the touch control chip.

* * * * *